(12) United States Patent
Bates et al.

(10) Patent No.: US 10,695,606 B2
(45) Date of Patent: Jun. 30, 2020

(54) EXERCISE TREADMILL

(71) Applicant: Lifecore Fitness, Inc., Carlsbad, CA (US)

(72) Inventors: Roger Bates, Carlsbad, CA (US); Marko Vujicic, Huntington Beach, CA (US); Gregory Allen Wallace, Mission Viejo, CA (US); Mark William Chiles, Yorba Linda, CA (US)

(73) Assignee: Lifecore Fitness, Inc., Carlsbad, CA (US)

( * ) Notice: Subject to any disclaimer, the term of this patent is extended or adjusted under 35 U.S.C. 154(b) by 232 days.

(21) Appl. No.: 15/833,991

(22) Filed: Dec. 6, 2017

(65) Prior Publication Data

US 2019/0168067 A1    Jun. 6, 2019

(51) Int. Cl.
| | |
|---|---|
| *A63B 22/02* | (2006.01) |
| *A63B 21/00* | (2006.01) |
| *A63B 1/00* | (2006.01) |
| A63B 22/00 | (2006.01) |

(52) U.S. Cl.
CPC ............ *A63B 22/0285* (2013.01); *A63B 1/00* (2013.01); *A63B 21/4033* (2015.10); *A63B 21/4041* (2015.10); *A63B 21/154* (2013.01); *A63B 22/0012* (2013.01)

(58) Field of Classification Search
CPC ..... A63B 1/00; A63B 21/154; A63B 21/4033; A63B 21/4041; A63B 22/0012; A63B 22/0285
See application file for complete search history.

(56) References Cited

U.S. PATENT DOCUMENTS

| | | | |
|---|---|---|---|
| 8,343,016 B1 * | 1/2013 | Astilean ............... | A63B 21/156 482/54 |
| 8,986,169 B2 * | 3/2015 | Bayerlein .......... | A63B 21/0053 482/54 |
| 9,005,085 B2 * | 4/2015 | Astilean ................ | A63B 22/02 482/54 |
| 9,914,015 B2 * | 3/2018 | Astilean ............... | A63B 21/156 |
| 9,956,450 B2 * | 5/2018 | Bayerlein .......... | A63B 21/0053 |
| 9,987,516 B1 * | 6/2018 | Chen .................. | A63B 22/0285 |

(Continued)

OTHER PUBLICATIONS

K. Sarychev, International Search Report and Written Opinion of the International Searching Authority in International application No. PCT/US2018/056395 (all pages).

*Primary Examiner* — Joshua Lee
(74) *Attorney, Agent, or Firm* — Anthony S. Weiser, Esq.; IPLCounsel.com (57) ABSTRACT

A treadmill has a front or rear set of pulleys and a looped running belt. The pulleys rotate with the movement of the belt, e.g., when a user walks, jogs, or runs on the treadmill. The pulleys are mounted on a rotating roller tube so that the roller tube rotates with the pulleys. The roller tube is mounted on a stationary shaft using bearings on each side and a one-way device that allows the pulleys to rotate in one direction. The rotation direction corresponds to the movement of the top of the belt from the front to the rear of the treadmill. The one-way device prevents the pulleys from rotating in the opposite direction, preventing the top of the belt from moving from the rear of the treadmill to the front. The one-way device may be a sprag clutch. The treadmill may be a motor-less, curved treadmill.

19 Claims, 9 Drawing Sheets

(56) References Cited

U.S. PATENT DOCUMENTS

| | | | |
|---|---|---|---|
| 10,238,911 B2* | 3/2019 | Bayerlein | A63B 21/0058 |
| 2004/0023757 A1 | 2/2004 | Fox | |
| 2012/0010048 A1* | 1/2012 | Bayerlein | A63B 21/0053 |
| | | | 482/2 |
| 2012/0010053 A1* | 1/2012 | Bayerlein | A63B 21/0053 |
| | | | 482/54 |
| 2012/0157267 A1* | 6/2012 | Lo | A63B 22/02 |
| | | | 482/54 |
| 2014/0213419 A1 | 7/2014 | Bayerlein et al. | |
| 2016/0023039 A1* | 1/2016 | Cei | A63B 22/0285 |
| | | | 482/54 |
| 2016/0367851 A1* | 12/2016 | Astilean | B62K 7/00 |
| 2017/0182356 A1* | 6/2017 | Cei | A63B 21/008 |
| 2018/0001134 A1* | 1/2018 | Bayerlein | A63B 21/0058 |
| 2019/0083844 A1* | 3/2019 | Bayerlein | A63B 21/0125 |
| 2019/0118030 A1* | 4/2019 | Yoo | A63B 22/02 |

\* cited by examiner

EXERCISE TREADMILL

FIELD OF THE INVENTION

This document generally relates to the field of exercise treadmills and techniques for mounting components to allow rotation of pulleys in one direction and to prevent rotation of pulleys in the opposite direction. This document also relates to facilitating appropriate hand placement on treadmill handlebars and corresponding foot placement on treadmill belt.

BACKGROUND

A typical treadmill has a looped running belt supported on each end by a roller assembly that rotates to allow a person (the treadmill user) to run, jog, or walk. There are motorized treadmills as well as manual treadmills. Treadmills, particularly of the manual (i.e., non-motorized) type, may be curved, to allow variation in exercise intensity. Manual treadmills preferably do not allow significant movement of the looped belt in the reverse direction, i.e., movement of the top surface from back to front. Preventing movement in the reverse direction may be achieved by installing a one-way clutch (a k a one-way bearing) on one of the roller assemblies.

A need in the art exist for new and better techniques for preventing reverse direction movement of looped belts on treadmills. A need in the art also exists for new and better designs of roller assemblies that allow rotation in one direction and prevent significant rotation in the opposite direction. A need in the art exists for techniques that help the user to coordinate treadmill handlebars gripping locations with the desired intensity and/or step length.

SUMMARY

Embodiments, variants, and examples described in this document are directed to apparatus and methods that may satisfy one or more of the above described needs and/or other needs. Select examples show treadmills with stationary shaft and rotating roller.

In an embodiment, a treadmill includes a frame. The treadmill also includes a looped running belt. The treadmill additionally includes a first roller assembly that has a first roller tube, a first rotating pulley and a second rotating pulley mounted on the first roller tube so that the first and second rotating pulleys rotate together with the first roller tube, a first shaft fixedly mounted on the frame so that the first shaft does not rotate with the first and second rotating pulleys and the first roller tube, a first load bearing, a second load bearing, and a one-way device. The treadmill further includes a second roller assembly mounted on the frame. The looped running belt is supported by the second roller assembly, the first rotating pulley, and the second rotating pulley, so that the first and second rotating pulleys rotate with movement of the looped running belt. The first load bearing and the second load bearing are disposed between the first roller tube and the first shaft, so that the first roller tube and the first and second pulleys can rotate around the first shaft. The one-way device comprises an inner ring and an outer ring, the inner ring being fixedly coupled to the first shaft not to rotate on the first shaft, the outer ring is fixedly coupled to the roller tube to allow the roller tube to rotate in a first direction around the first shaft and to prevent the roller tube from rotating around the first shaft in a second direction that is opposite to the first direction, the first and second directions being such that top surface of the looped running belt can move from front of the treadmill to rear of the treadmill and the top surface is prevented from moving from the rear of the treadmill to the front of the treadmill.

In an embodiment, a treadmill includes a frame; a looped running belt; and a first roller assembly comprising a first rotating pulley and a second rotating pulley, a second roller assembly comprising a third rotating pulley and a fourth rotating pulley, the first roller assembly and the second roller assembly being mounted on the frame, the looped running belt being supported by the first rotating pulley, the second rotating pulley, the third rotating pulley, and the fourth rotating pulley. The first roller assembly also comprises means for allowing top surface of the running belt to move from front to rear of the treadmill and for preventing the top surface from moving from rear to front of the treadmill.

These and other features and aspects of selected embodiments, variants, and examples consistent with the present disclosure will be better understood with reference to the following description, drawings, and appended claims.

DETAILED DESCRIPTION

The words "embodiment," "variant," "example," and similar words and expressions as used herein refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and do not necessarily strictly limit the invention(s) disclosed.

A "one-way device" refers to a one-way sprocket or a one-way clutch (a k a "one-way clutch bearing" or "one-way bearing") or analogous type of ratcheting mechanism that allows rotation in one direction only. A "one-way clutch" means a sprag clutch, a rolling element that allows rotation in one direction but locks up to prevent movement in the other direction. A sprag clutch typically employs spring-loaded sprag rollers that allow one element to freewheel around another element, until the rotation direction is reversed.

A curved treadmill allows a user to walk/jog/run on a curved surface, for example, a surface that varies the incline from substantially flat horizontal (zero degrees) or even a slight negative setting (decline, say a decline of less than 10 degrees) to an incline that provides substantial increase in the exercise intensity, for example, 8-30 degrees from horizontal.

Some definitions have been explicitly provided above. Other and further explicit and implicit definitions and clarifications of definitions may be found throughout this document.

Figure 1:
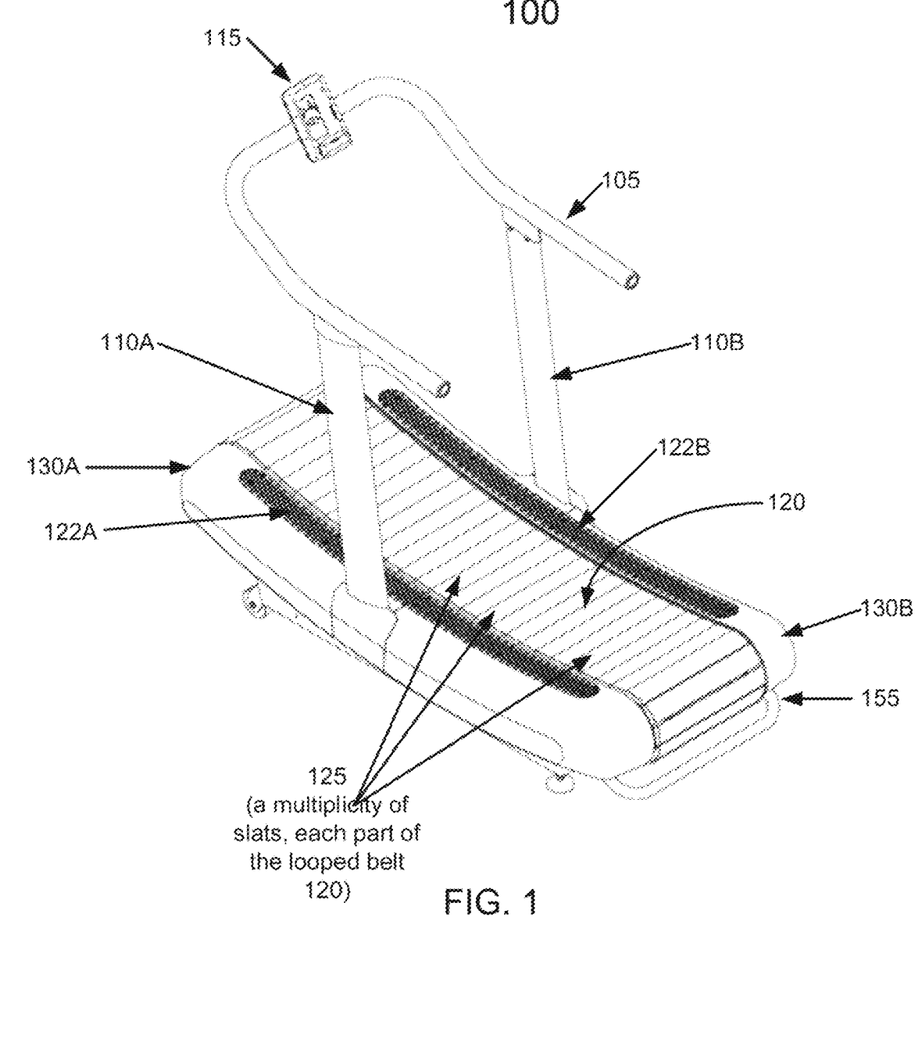
FIG. 1 is a perspective view illustrating selected components and features of a curved treadmill, in accordance with selected aspects of this disclosure.

FIG. 1 is a perspective view illustrating selected components of a curved treadmill 100. In this example, the treadmill 100 is a motorless treadmill. The treadmill 100 includes handlebars 105 attached to handlebar mounts 110A/110B, electronic monitor/controller module 115 attached substantially at the center of the handlebars 105, a looped belt 120 made of a large number (e.g., 40-100) of individual slats 125, and protective shrouds 130A and 130B on the sides of the treadmill. Step boards 122A and 122B on the tops of the shrouds 130A and 130B, respectively, provide traction surfaces that the user can step on when mounting and dismounting from the treadmill 100. A raising bar 155 at the rear of the treadmill 100 allows the user to lift the rear of the treadmill 100 off the floor and move the treadmill 100 on its front wheels.

Figure 2:
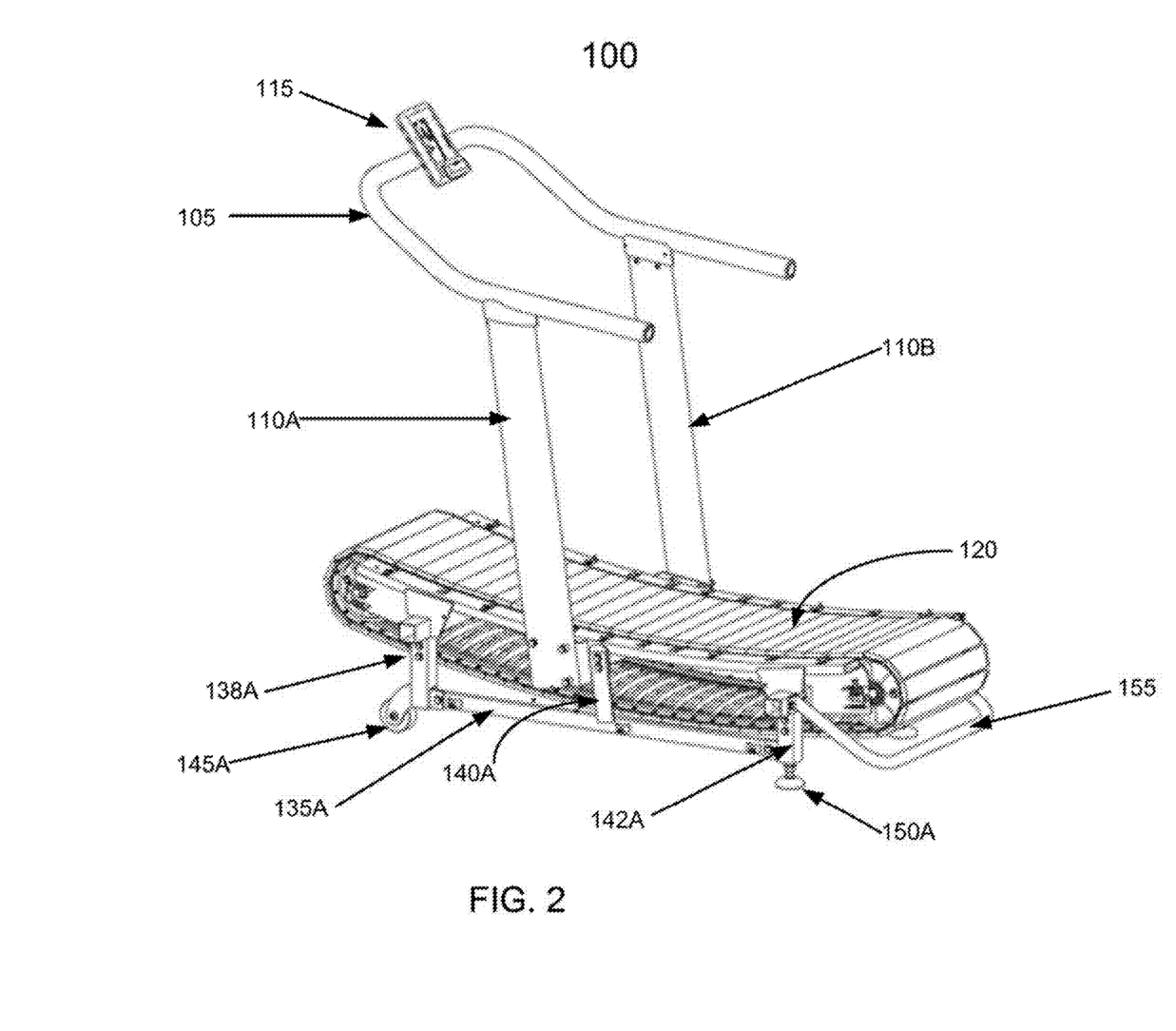
FIG. 2 and FIG. 3 are perspective views of the treadmill of FIG. 1 with side shrouds removed.
Figure 3:
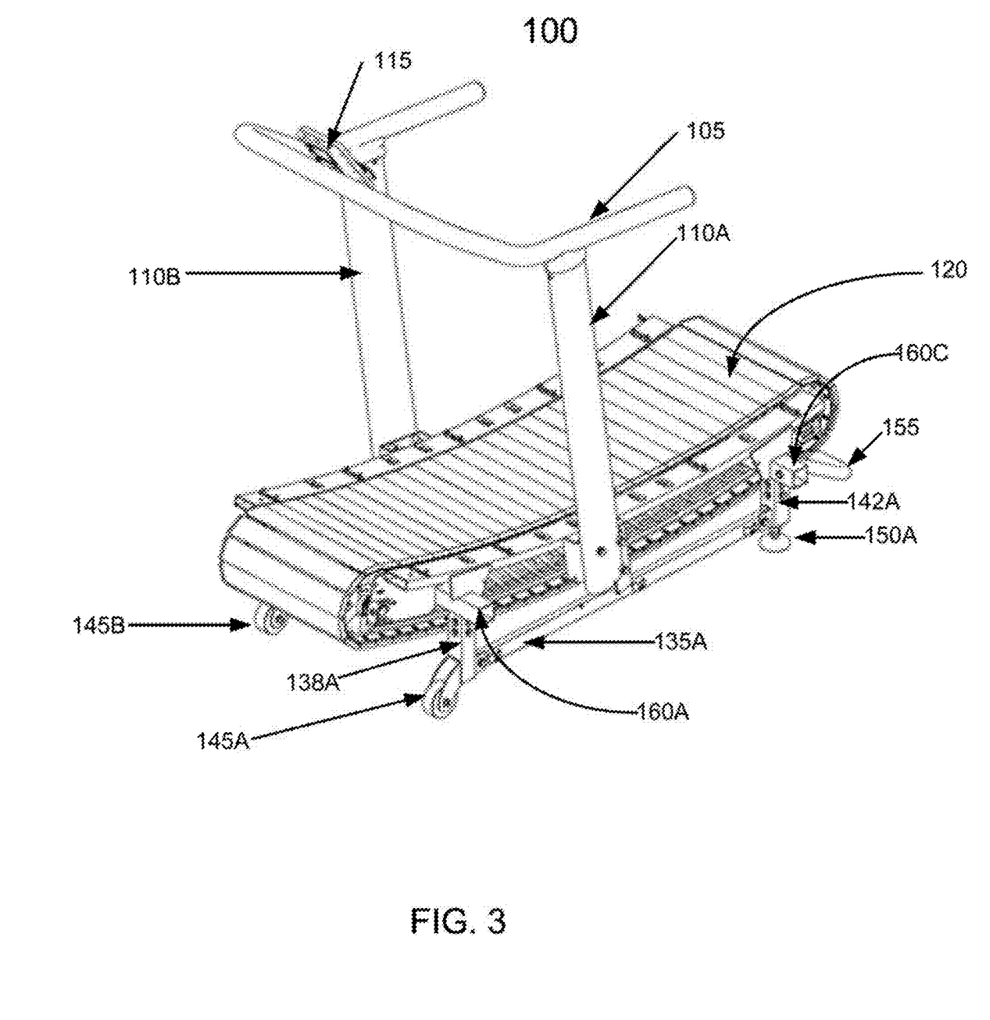

FIG. 2 and FIG. 3 are perspective views of the treadmill 100 with the shrouds 130A and 130B removed. As can be seen in these Figures, the treadmill 100 further includes a longitudinal frame bar 135A on the left side; another longitudinal frame bar 135B (not shown in these Figures) is analogous to the frame bar 135A mutatis mutandis and is disposed in a similar position on the right side of the treadmill 100. ("Left" and "right" have been arbitrarily selected with reference to a user as the user would be walking/jogging/running forward on the treadmill 100.) Vertical supports 138A, 140A, and 142A support the curved assembly on the left side. Again, analogous arrangement mutatis mutandis is on the right side of the treadmill 100. The treadmill 100 rests on front wheels 145A and 145B, and on adjustable non-wheeled supports in the rear 150A (on the left side) and 150B (on the right side, shown in FIG. 4).

Figure 4:
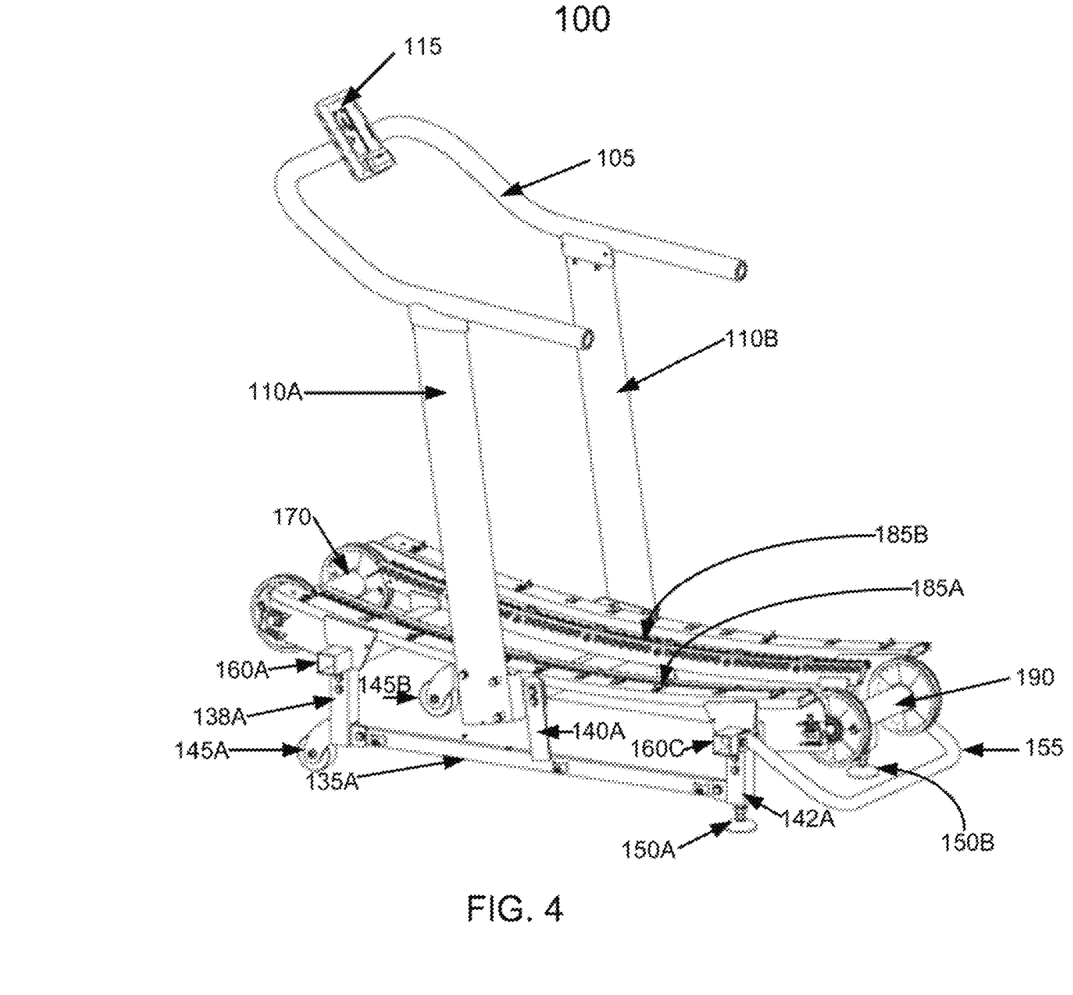
FIG. 4 and FIG. 5 are perspective views of the treadmill of FIG. 1 with the shrouds and the looped running belt removed.
Figure 5:
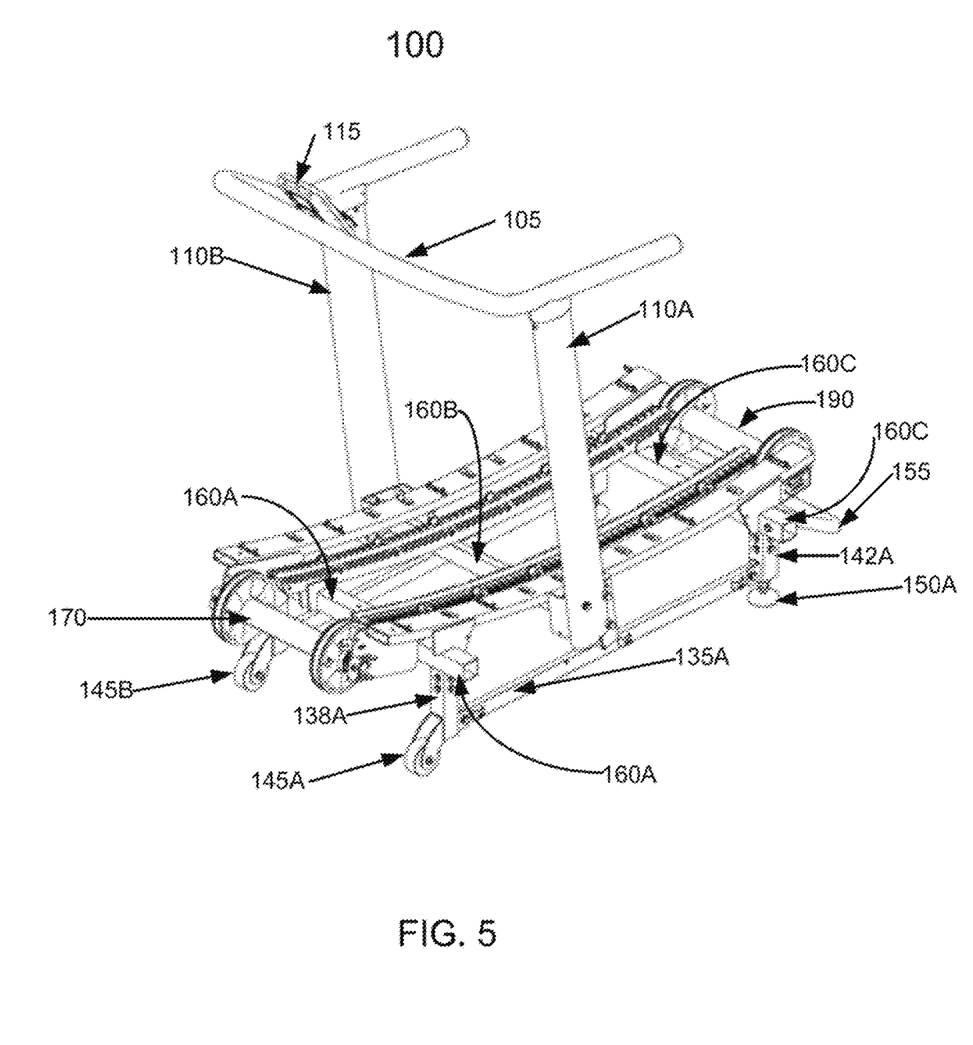

FIG. 4 and FIG. 5 are perspective views of the treadmill 100 with the shrouds 130A/130B and the belt 120 removed, providing a better view of frame cross-members 160A/160B/160C, which can be seen extending between the longitudinal frame bars 135A/135B. These Figures also show portions of a multi-component front roller assembly 170 and a multi-component rear roller assembly 190.

Figure 6:
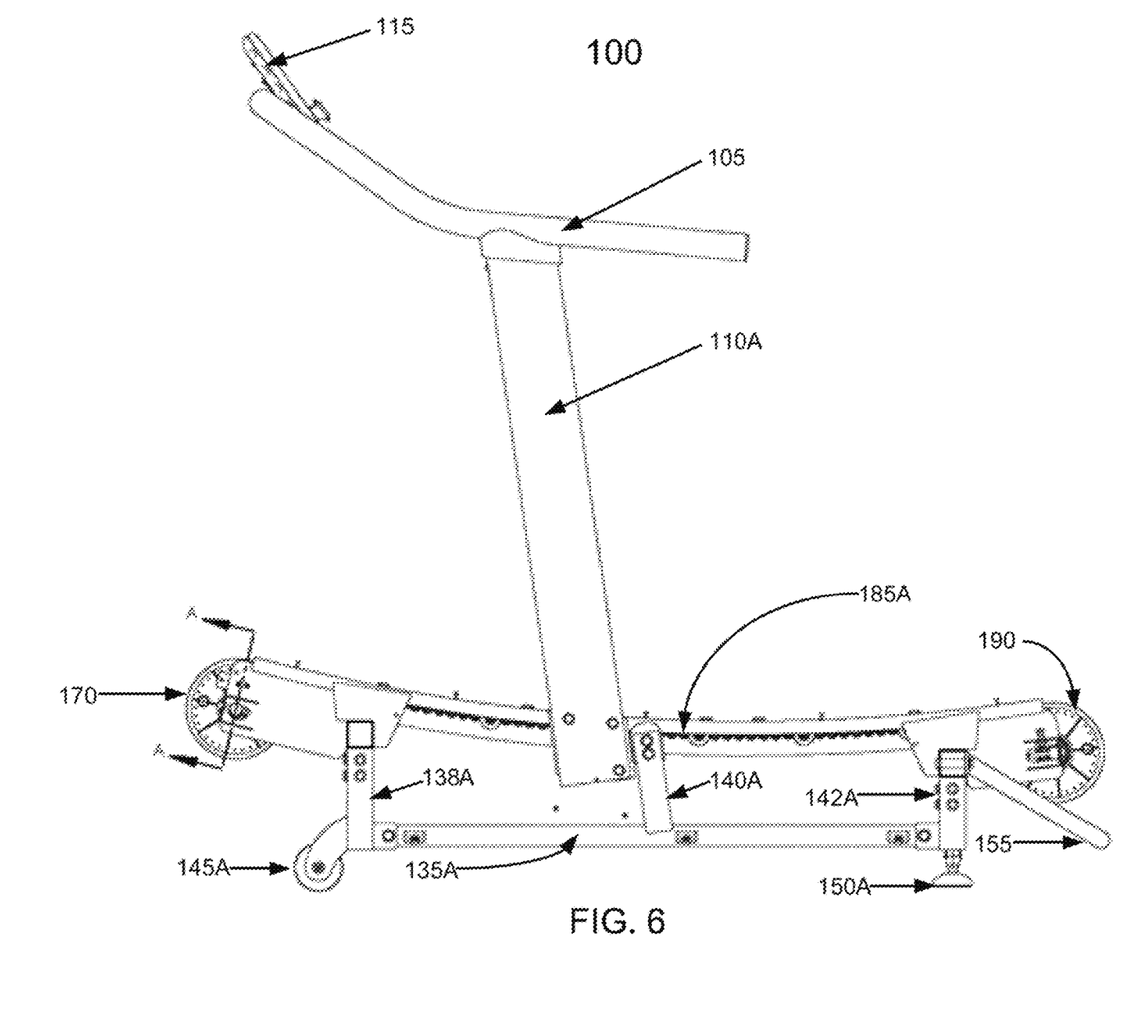
FIG. 6 is a side plan view of the treadmill of FIG. 1 with the shrouds and the looped running belt removed.

FIG. 6 is a side view of the treadmill 100.

Figure 7:
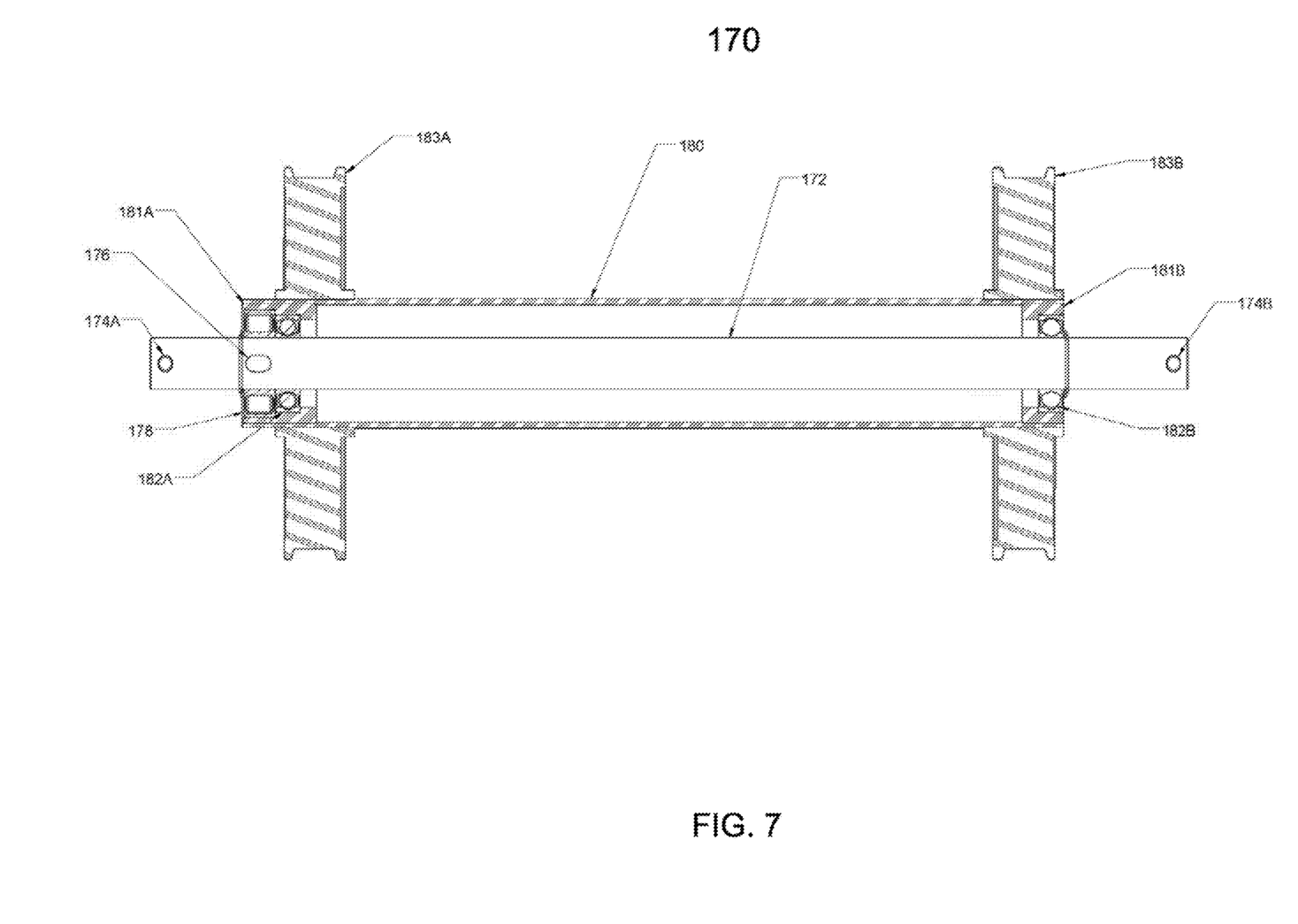
FIG. 7 is a sectional view of the front roller assembly of the treadmill of FIG. 1.

FIG. 7 is a sectional view of the front roller assembly 170, along the section AA (which is shown in FIG. 6).

At the center of the front roller assembly is a shaft 172. Through holes 174A and 174B on the ends of the shaft 172 receive bolts that secure the shaft 172 to the frame of the treadmill 100. Note that the shaft 100 is not intended to rotate relative to the frame in response to the movement of the belt 120. Oval indentation 176 in the surface of the shaft 172 is designed to receive a key that can be press-fit into the indentation 176; the key is intended to protrude from the shaft 172 and to fit into a corresponding bearing keyway on the surface of the inner ring of a one-way clutch bearing 178, fixing (preventing rotation of) the inner ring of the one-way clutch 178 relative to the shaft 172. It is possible to manufacture the shaft with the key being integral to the shaft.

A roller tube 180 surrounds the shaft 172. It may be machined from metal, e.g., steel or iron. On the left side, a cylindrical metal insert 181A is press-fitted inside the roller tube 180. The one-way clutch 178 is press-fitted inside the insert 181A. The insert 181A also receives a conventional (not one-way) load bearing 182A. The bearing 182A may also be press-fitted into the insert 181A. A pulley 183A is fixedly attached (e.g., glued) onto the roller tube 180.

On the right side of the assembly 170, another pulley 183B is fixedly attached (e.g., glued) onto the roller tube 180, and a second cylindrical metal insert 181B is press-fitted inside the roller tube 180. The pulleys 183A/B may be injection molded plastic. The second metal insert 181B receives a second conventional load bearing 182B, which may be press-fitted inside the insert 181B. Note that the second insert 181B may be (but need not be) shorter than the first insert 181A, because there is no need for a second one-way clutch. (Of course, a second one-way clutch may also be employed on the right side.)

Figure 8:
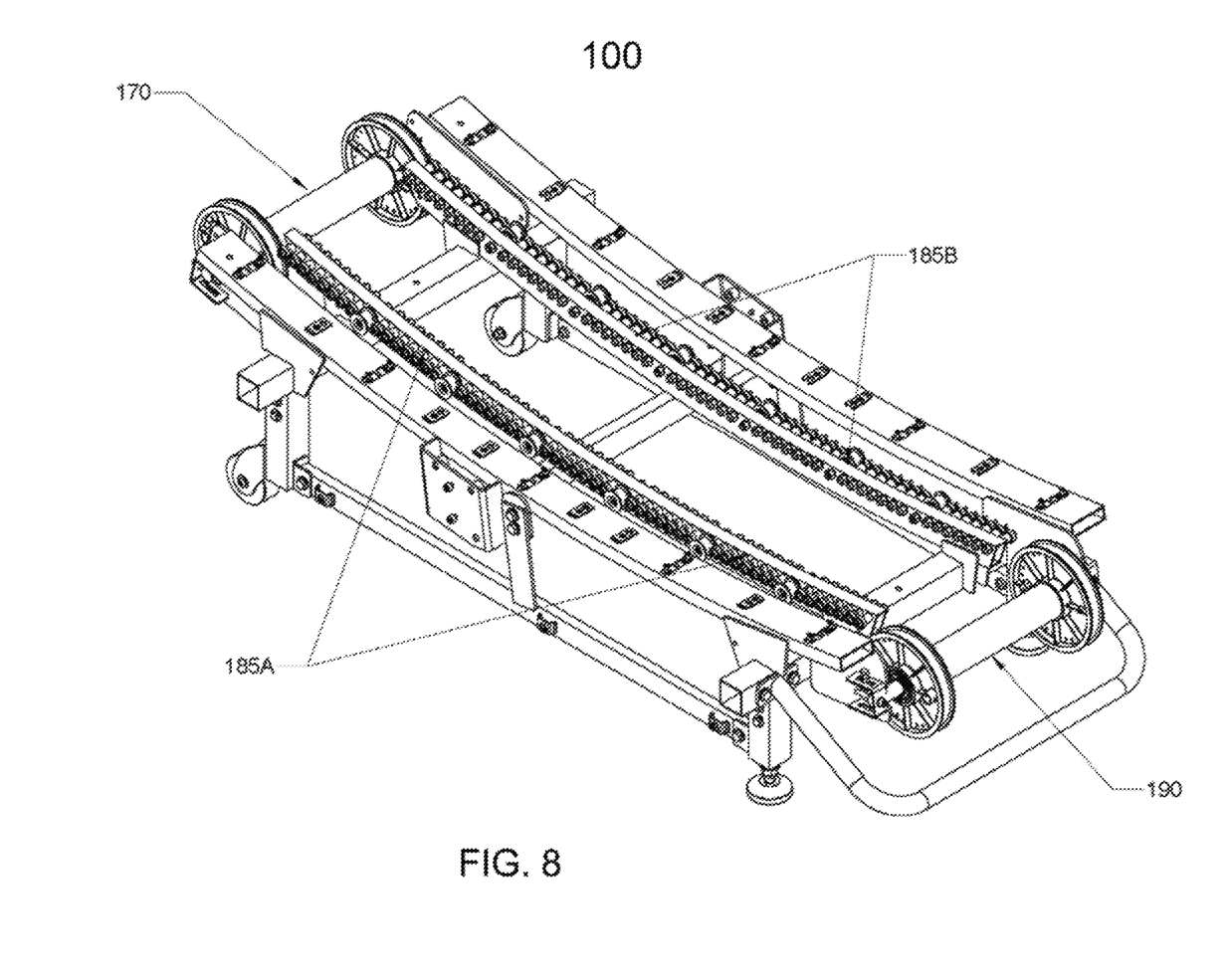
FIG. 8 is another perspective view of the treadmill of FIG. 1 with a number of components removed.

The pulleys 183A and 183B support the belt 120, which on its inside has two sets of guiding protrusions running along the belt 120. The guiding protrusions are set at such a width that each fits between the flanges of its corresponding pulley 183A or 183B. As can be seen in FIG. 8, which is another perspective view of the treadmill 100 with the shrouds 130A/B and the belt 120 removed, there are rows 185A and 185B of supporting/guiding bearings interspersed with guiding pulleys, along the sides of the step boards 122A/122B of the treadmill 100. The bearings and pulleys of the rows 185A/B support the belt 120 and, together with the flanges of the pulleys 183A/B guide (prevent excessive side slippage of) the belt 120. The guiding protrusions of the belt 120 fit between the flanges of the guiding pulleys of the rows 185A/B.

In operation, the roller tube 180 would be free to rotate around the shaft 172 in either direction, but for the presence of the one-way clutch 178. The one-way clutch 178 allows rotation only in one direction. Viewed from the left side of the treadmill 100, the roller tube 180 and the pulleys 183A and 183B can rotate clockwise, to allow the top surface of the belt 120 to move from the front to the rear of the treadmill 100 as the user walks/jogs/runs forward on the belt 120.

The rear roller assembly 190 may be quite similar to the front roller assembly 170. The assembly 190, however, need not include a one-way clutch or another one-way device, because the belt 120 should not have significant movement in the undesirable direction due to the one-way clutch 178 on the front roller assembly 170. The rear roller assembly 190 may also differ significantly from the front roller assembly 170; for example, the rear roller assembly may have pulleys mounted on a rotating shaft supported by a pair of bearings mounted in the frame of the treadmill.

In embodiments, another type of one-way device is employed in the stead of the one-way clutch bearing 178. In embodiments, each side of the rear roller assembly 190 is analogous to the right side of the front roller assembly 170. In embodiments, there is a one-way device on one end or both ends of the rear roller assembly 190. In embodiments, a one-way clutch (or another one-way device) is installed on one, two, three, or all four ends of the roller assemblies 170 and/or 190. In embodiments, the treadmill is a motorless treadmill, while in other embodiments the treadmill is motorized.

Figure 9:
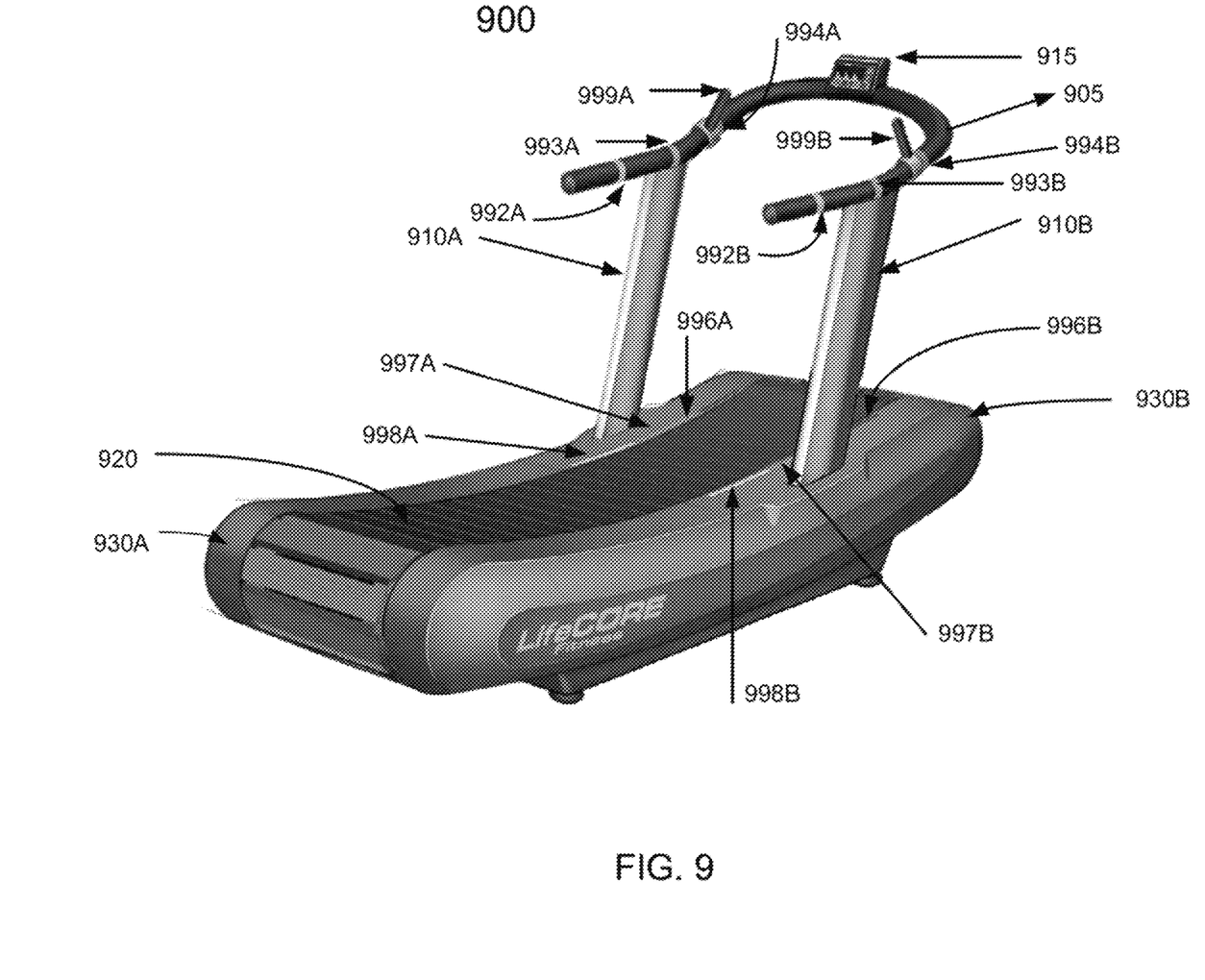
FIG. 9 is a perspective view of a treadmill with color-coded vertical hand grip positions and corresponding color coded front foot placement positions.

FIG. 9 is a perspective view of a treadmill 900 with color-coded vertical hand grip positions and corresponding color-coded front foot placement positions. The treadmill 900 (which is curved in the shown embodiment) includes a looped running belt 920, handlebars 905, handlebar mounts 910A/910B, shrouds 930A/930B, and electronic monitor/controller module 915. The treadmill 900 also includes vertical grips 999A and 999B, which may be fastened in different positions on the handlebars 905. The vertical grips 999A/B may be fastened in different positions using, for example, locking screws. In the shown embodiment, there are three positions on each side for the vertical grips. The three pairs of handlebar positions are marked with bands or LEDs of different colors. For example, bands 992A and 992B may be yellow; bands 993A and 993B may be orange; and bands 994A and 994B may be red. Corresponding color strips are disposed on each side of the belt 920. For example, color strips 998A and 998B may be yellow; color strips 997A and 997B may be may be orange; and color strips 996A and 996B may be red. The color strips may be glued, e.g., on the shrouds 930A/930B at the sides of the belt 920. In embodiments, each color strip includes one or more LEDs of appropriate color (red LED for a red strip, orange LED for orange strip, etc.). The placement of the color bands 992/993/994 and the color strips 996/997/998 are "corresponding" in the sense that, for a user (the specific user in the case the placements are user-adjustable, or an average user), appropriate placements of the vertical grips 999A/B and the strips 1096/1097/1098 are indicated by the same color for a given exercise level. In the shown embodiment, for example, yellow may correspond to walking, orange may correspond to jogging, and red may correspond to running. Thus, when the user intends to walk, he or she may place vertical grips at the yellow bands 992A/B, and then place feet in the area between the yellow strips 998A/B; when the user intends to jog, he or she may place the vertical grips at the orange bands 993A/B, and then place feet in the area between the orange strips 997A/B; and when the user intends to run, he or she may place the vertical grips at the red bands 994A/B, and then place feet in the area between the red strips 996A/B.

The electronic monitor/controller module may include a display and may be connected to sensor(s) (such as a speed sensor and/or a load sensor and/or a heart rate sensor), to provide information to the user of the treadmill regarding the user's workout. The information may include speed, distance, total caloric expenditure, current caloric burn rate, current heart rate, highest heart rate achieved during the workout, and other data.

The features described throughout this document may be present individually, or in any combination or permutation, except where the presence or absence of specific elements/limitations is inherently required, explicitly indicated, or otherwise made clear from the context.

Not every illustrated element is necessarily required in every embodiment in accordance with the concepts described in this document, while some elements that have not been specifically illustrated may be desirable in some embodiments in accordance with the concepts.

This document describes in detail the inventive treadmills and roller assemblies. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A treadmill comprising:
    a frame;
    a looped running belt;
    a first roller assembly comprising a first roller tube, a first rotating pulley and a second rotating pulley mounted on the first roller tube so that the first and second rotating pulleys rotate together with the first roller tube, a first shaft fixedly mounted on the frame so that the first shaft does not rotate with the first and second rotating pulleys and the first roller tube, a first load bearing, a second load bearing, and a one-way device; and
    a second roller assembly mounted on the frame;
    wherein:
    the looped running belt is supported by the second roller assembly, the first rotating pulley, and the second rotating pulley, so that the first and second rotating pulleys rotate with movement of the looped running belt;
    the first load hearing and the second load hearing are disposed between the first roller tube and the first shaft, so that the first roller tube and the first and second pulleys can rotate around the first shaft;
    the one-way device comprises an inner ring and an outer ring, the inner ring being fixedly coupled to the first shaft not to rotate on the first shaft, the outer ring is fixedly coupled to the first roller tube to allow the first roller tube to rotate in a first direction around the first shaft and to prevent the first roller tube from rotating around the first shaft in a second direction that is opposite to the first direction, the first and second directions being such that a top surface of the looped running belt can move from the front of the treadmill to tyre rear of the treadmill and the top surface of the looped running belt is prevented from moving from the rear of the treadmill to the front of the treadmill.

2. The treadmill according to claim 1, further comprising a first row that comprises a first plurality of supporting/guiding bearings interspersed with a first plurality of guiding pulleys along a first longitudinal side of the frame, and a second row that comprises a second plurality of supporting/guiding bearings interspersed with a second plurality of guiding pulleys along a second longitudinal side of the frame, the first and second rows supporting the looped running belt.

3. The treadmill according to claim 2, wherein inside surface of the looped running belt comprises a first protrusion along a first side of the running bolt that is proximate to the first longitudinal side of the frame, and a second protrusion along a second side of the running belt that is proximate to the second longitudinal side of the frame, the first protrusion being dimensioned to fit into the first plurality of guiding pulleys, the second protrusion being dimensioned to fit into the second plurality of guiding pulleys, whereby the first plurality of supporting/guiding bearings and the first plurality of guiding pulleys support a first side of the looped running belt and the second plurality of supporting guiding bearings and the second plurality of guiding pulleys support a second side of the looped running belt.

4. The treadmill according to claim 1, wherein the second roller assembly comprises:
a third rotating pulley;
a fourth rotating pulley;
a second shaft fixedly mounted on the frame so that the second shaft does not rotate with the third and fourth rotating pulleys;
a second roller tube, the third rotating pulley and the fourth rotating pulley being mounted on the second roller tube to rotate together with the second roller tube;
a third load bearing and a fourth load bearing disposed between the second roller tube and the second shaft, so that the second roller tube and the third and fourth pulleys can rotate around the second shaft.

5. The treadmill according to claim 1, wherein the first roller assembly or the second roller assembly further comprises an additional one-way device configured to prevent the top surface of the looped running belt from moving from the rear of the treadmill to the front of the treadmill.

6. The treadmill according to claim 1, wherein the first roller assembly is a front roller assembly so that the first shall is mounted on the frame closer to the front of the treadmill than the second roller assembly.

7. The treadmill according to claim 1, wherein the first roller assembly is a rear roller assembly so that the first shaft is mounted on the frame closer to the rear of the treadmill than the second roller assembly.

8. The treadmill according to claim 1, wherein the first roller assembly further comprises:
a first insert between (a) outside of the first load hearing and the outer ring of the one-way device and (b) inside of the first roller tube, the first insert being on a first end of the first shaft; and a second insert between (a) outside of the second load bearing and (h) inside of the first roller tube, the second insert being on a second end of the first shaft.

9. The treadmill according to claim 8, wherein the one-way device comprises a one-way clutch, the inner ring comprises portions defining a keyway, and the first shaft comprises a key configured to protrude into the keyway thereby fixing the inner ring to the first shaft.

10. The treadmill according to claim 9, wherein the first insert and the second insert are made of metal, the first insert and the second inserts are press-fitted into the first roller tube, the second insert is shorter than the first insert, and the first and second pulleys are made of injection molded plastic.

11. The treadmill according to claim 10, wherein the first shaft is fixed to the frame with a first bolt near the first end of the first shaft and with a second bolt near the second end of the first shaft.

12. The treadmill according to claim 1, wherein the treadmill is motorless.

13. The treadmill according to claim 1, wherein the treadmill is motorized.

14. The treadmill according to claim 1, further comprising a display, electronics, and one or more sensors configured to provide information to a user of the treadmill regarding a workout of the user.

15. The treadmill according to claim 1, further comprising handlebars to allow the user to hold onto the treadmill when exercising.

16. The treadmill according to claim 1, wherein the looped running belt comprises a multiplicity of interconnected slats.

17. The treadmill according to claim 1, wherein the frame is configured so that the top surface of the looped running belt is curved to allow variation in exercise intensity.

18. The treadmill according to claim 1, wherein the frame is configured so that the top surface of the looped running belt is curved so that incline of the looped running belt varies by at least 20 degrees from end to end.

19. The treadmill according to claim 1, further comprising a raising bar attached to rear of the frame, and a pair of wheels attached to front of the frame.

* * * * *